United States Patent
Karesa

(10) Patent No.: US 6,290,890 B1
(45) Date of Patent: Sep. 18, 2001

(54) METHOD FOR FABRICATING THERMOFORMED PLASTIC LAMINATE ARTICLES

(76) Inventor: Peter B. Karesa, 21133 43rd Avenue, Langley, British Columbia (CA), V3A 7M9

( * ) Notice: Subject to any disclaimer, the term of this patent is extended or adjusted under 35 U.S.C. 154(b) by 0 days.

(21) Appl. No.: 09/451,771

(22) Filed: Dec. 1, 1999

(51) Int. Cl.⁷ .................................................. B29C 33/40
(52) U.S. Cl. ........................................ 264/227; 156/245
(58) Field of Search ................... 264/227, 226; 156/242, 245

(56) References Cited

U.S. PATENT DOCUMENTS

| | | | |
|---|---|---|---|
| 3,582,424 | * 6/1971 | Norvaisa | 156/245 |
| 3,619,446 | * 11/1971 | Nauta | 264/226 |
| 4,601,867 | * 7/1986 | Martell et al. | 264/227 |
| 5,070,668 | * 12/1991 | Lieberman | 52/309.9 |
| 5,225,133 | * 7/1993 | Ihara et al. | 264/163 |
| 5,435,959 | * 7/1995 | Williamson et al. | 264/221 |

* cited by examiner

*Primary Examiner*—Michael W. Ball
*Assistant Examiner*—Barbara J. Musser
(74) *Attorney, Agent, or Firm*—Hall, Priddy, Myers & Vande Sande

(57) ABSTRACT

A process for making laminate articles, which includes fabricating a prototype article having an article interface surface, forming a female mould from the prototype article, and forming a male mould from the female mould. An inner shell is then made from the female mould and an outer shell from the male mould. The inner and outer shells are bonded together to form a laminate article.

5 Claims, 1 Drawing Sheet

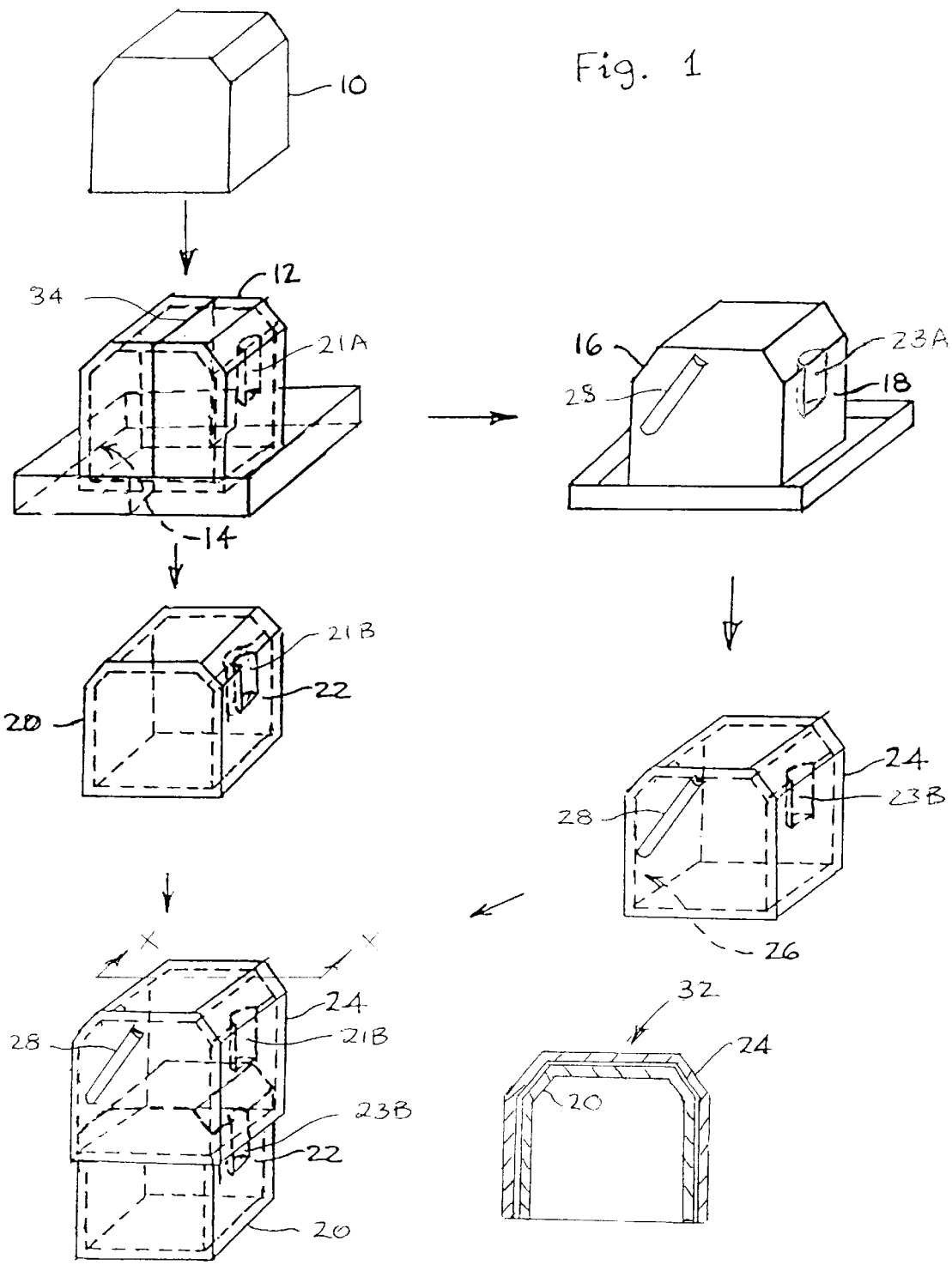

METHOD FOR FABRICATING THERMOFORMED PLASTIC LAMINATE ARTICLES

FIELD

The present invention relates to a process and apparatus for fabricating laminate articles having thermoplastic inner and outer shells.

BACKGROUND

The fabrication of multi-layered plastic articles in which the layers are bonded together produces a stiff article of a greater rigidity than can be achieved with a single sheet. However, any deficiency in the bond between the layers or shells results in a loss of strength in the laminate article. Thus, it is important to have shells which mate perfectly at their interface so that the bonding can be across the entire interface. In fabricating male and female moulds extreme accuracy is, therefore, required to match the mould surfaces. For parts having complex surfaces such accuracy is difficult to achieve. Elaborate jigs and measurement techniques are required when the moulds are to be fabricated manually. If computer controlled machines are used then the cost of these machines represents a significant expense.

Accordingly, it is an object of the invention to provide an improved method of fabricating thermoformed plastic articles. It is a further object of the invention to provide a method of producing male and female moulds with interface surfaces formed with a high degree of accuracy.

SUMMARY OF THE INVENTION

According to the invention there is provided a process for making moulds used to produce laminate articles. The process includes making a mirror image mould from one of a female mould and male mould so as to produce a production male and female mould. The use of a mirror image ensures the required accuracy in fitting together parts made from the production male and female moulds.

The process may further include making an inner shell from the female mould and an outer shell made from the male mould. The inner shell may be bonded to the outer shell to form a laminate article.

The outer surface of the inner shell may be bonded with an inner surface of the outer shell. The bonding step may employ an adhesive that is free of non-recyclable contaminants and material of the inner and outer shells may, preferably, be recyclable. This allows the finished product to be ground up and reused in making further laminate articles.

The inner and outer shells may be made of co-extruded thermoplastic sheet while the co-extruded thermoplastic sheet may have a substrate layer of recycled material and a cap layer of protective material.

The method may further include fabricating a prototype article having an article interface surface, forming a female mould from the prototype article, and forming a male mould from the female mould. An inner shell is made from the female mould while an outer shell is made from the male mould. The inner shell is bonded to the outer shell to form a laminate article.

The co-extruded thermoplastic sheet may have a substrate layer of recycled material and a cap layer of protective material.

The bonding step may employ an adhesive that is free of non-recyclable contaminants and material of said inner and outer shells is recyclable.

Features such as reinforcing, mounting brackets, and edge details may be affixed to a visible surface of the outer mould and a visible surface of the inner mould.

BRIEF DESCRIPTION OF THE DRAWINGS

Further features and advantages will be apparent from the following detailed description, given by way of example, of a preferred embodiment taken in conjunction with the accompanying drawings, wherein:

FIG. 1 shows the various steps in fabricating a laminate article in accordance with a preferred embodiment of the invention; and FIG. 2 is a sectional view of a laminate article formed in accordance with a preferred embodiment of the invention.

DETAILED DESCRIPTION WITH REFERENCE TO THE DRAWINGS

Referring to FIG. 1 a male prototype of an article 10 is first fabricated by conventional means such as milling, sawing, gluing, etc. Using the prototype, a split female mould 12 is made having an interface surface 14 that corresponds with the interface surface of the prototype 10. From the female mould 12 one again makes a male mould 16 having an interface surface 18. Having the female mould 12 split makes it easier to remove it from the male mould 16 Changes in design such as the addition of features 21A and 23A to the female and male moulds 12 and 16, respectively, are added. Additional support, mounting or edge details 28 may then be added to the male mould.

Using the split female mould 12 one vacuum forms an inner shell 20 having an interface surface 22. Using the male mould 16 one vacuum forms an outer shell 24 having an interface surface 26. Both sheets are each of coextruded or two-layer thermoplastic sheet having a substrate layer of recycled material and a cap layer of protective material. At this point the interface surfaces 22 of inner shell 20 and 26 of outer shell 24 match perfectly because that of outer shell 24 comes from the interface surface 18 of mould 16 which, in turn, is made from interface surface 14 of female mould 12 while that of inner shell 20 is also made from interface surface 14 of female mould 12. Once fabricated the shells 20 and 24 are trimmed on a 5-axis CNC router using customized holding fixtures and trimming programs. The edge geometry of the inner shell is generally designed to be different from that of the outer shell, consequently, the two shells are trimmed separately.

The final step of the process is to apply a bonding agent between the interface surfaces 22 and 26 prior to inserting the inner shell 20 into outer shell 24 and then using inner and outer frames combined with a pneumatic clamping system. An articulating fixture evenly distributes clamping force to allow simultaneous pressure over the entire bonding surface. The trimmed shells are bonded together using an adhesive having high bond strength and full recyclability. This adhesive is chemically similar to the shell materials and, therefore, does not introduce non-recyclable contaminants. At the end of its useful life, the two-shell laminated part can be ground up and extruded into new sheet. All components of the laminated part are recyclable without the need for a costly adhesive removal process. FIG. 2 shows the completed laminated product 32 in cross-section, with inner shell 20 bonded to outer shell 24. Because of the fact that the interface surface of the male mold is taken directly from the interface surface of the female mold, the contacting surfaces of the inner and outer shells 20 and 24 match perfectly and fit together exactly at the bonding surfaces. Thus, a two shell laminated part is formed in which there is uniform bonding over the entire contact surface. Moreover, since the shell surfaces visible in the final part do not physically contact their respective molds, they, therefore, retain an optimal surface finish.

While a simple geometric shape has been used for simplicity and convenience, obviously much more complex shapes could be involved.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A process for making molds, comprising:
   a) making a prototype of an article with a non-closed surface;
   b) making a first male or female mold from said prototype, said first mold having a first mold interface surface;
   c) making a mirror image mold from said first mold, said mirror image mold having a mirror image interface surface wherein said first mold interface surface mates with said mirror image mold interface surface;
   d) modifying said first mold and said mirror image mold so that they are capable of use in vacuum-forming; and
   e) adding features to the mold interface surfaces of one of said first and mirror image molds.

2. The process according to claim 1, wherein said first mold and said mirror image mold are production molds.

3. A process for making laminate articles, comprising:
   a) making a prototype of an article;
   b) making a first mold from said prototype, said first mold having a first mold interface surface;
   c) making a mirror image mold from said first mold, said mirror image mold having a mirror image mold interface surface wherein said first mold interface surface mates with said mirror image mold interface surface;
   d) modifying said first mold and said mirror image mold so that they are capable of use in vacuum-forming; and
   e) adding features to the mold interface surfaces of one of said first and mirror image molds;
   f) forming a first shell from said first mold;
   g) forming a second shell from said mirror image mold;
   h) bonding said first shell to said second shell to form a laminate article.

4. The process according to claim 3, wherein said first mold is a female mold and said mirror image mold is a male mold.

5. The process according to claim 3, wherein said first mold is a male mold and said mirror image mold is a female mold.

* * * * *